No. 744,984. PATENTED NOV. 24, 1903.
H. J. SPRINGER.
POTATO PLANTER.
APPLICATION FILED JUNE 5, 1903.
NO MODEL.
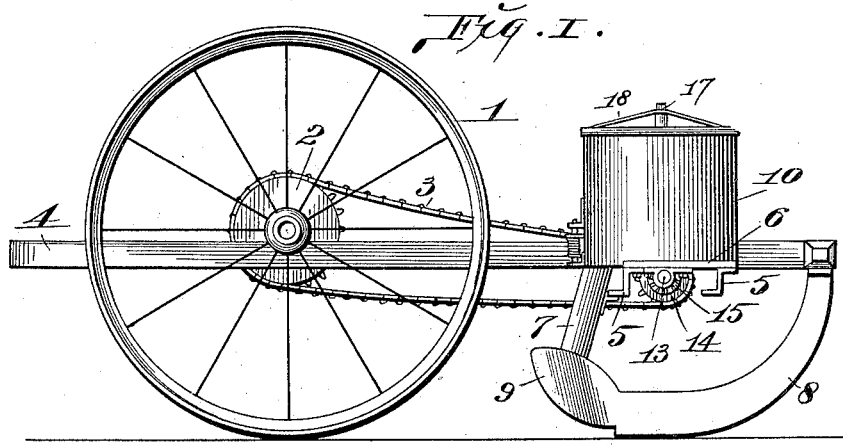
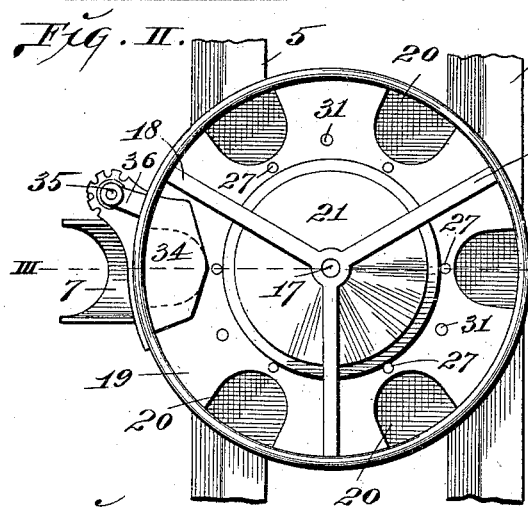
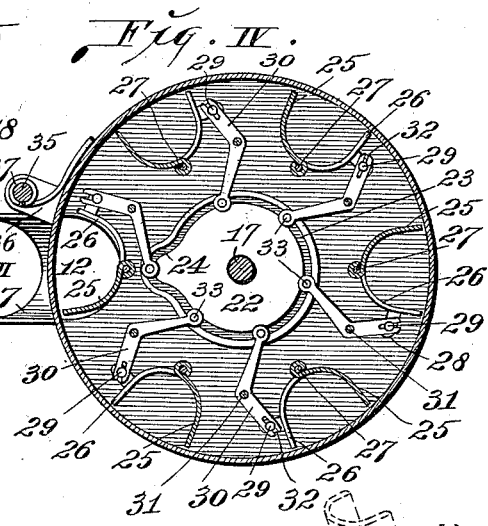
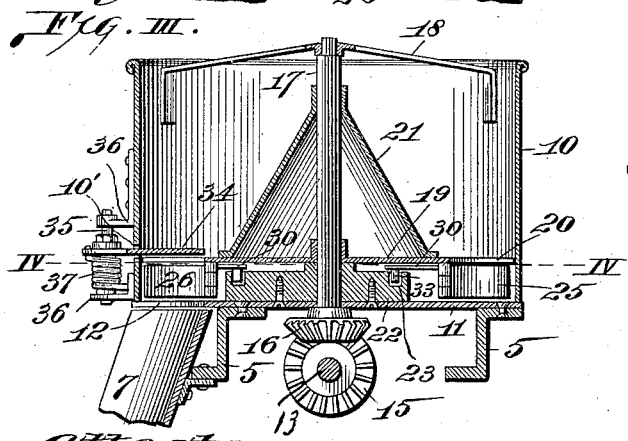
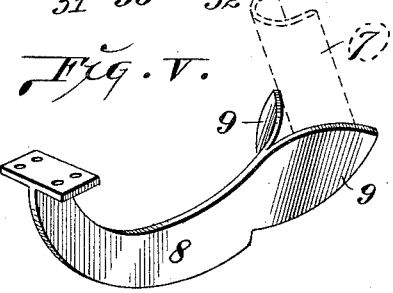
Attest:
M. F. Smith
E. S. Knight
Inventor:—
H. J. Springer;
By Wright Bro.
Atty's.

No. 744,984. Patented November 24, 1903.

UNITED STATES PATENT OFFICE.

HENRY J. SPRINGER, OF EDWARDSVILLE, ILLINOIS.

POTATO-PLANTER.

SPECIFICATION forming part of Letters Patent No. 744,984, dated November 24, 1903.

Application filed June 5, 1903. Serial No. 160,191. (No model.)

*To all whom it may concern:*

Be it known that I, HENRY J. SPRINGER, a citizen of the United States, residing in the city of Edwardsville, State of Illinois, have invented certain new and useful Improvements in Potato-Planters, of which the following is a full, clear, and exact description, reference being had to the accompanying drawings, forming part of this specification.

My invention relates to a machine for planting potatoes in rows and dropping them therein at uniform spaces.

The invention consists of features of novelty hereinafter fully described, and pointed out in the claims.

Figure I is a side elevation of my machine. Fig. II is a top view of the seedbox of the machine. Fig. III is a vertical section taken centrally through the seedbox and the drop mechanism working therein. Fig. IV is a horizontal section taken on line IV IV, Fig. III. Fig. V is a perspective view of the furrow-opening shoe of the machine.

1 designates one of the two ground-wheels of my machine, which are connected by an axle, to which is fixed a sprocket-wheel 2, that receives an endless chain 3.

4 is the planter-frame, that extends forwardly from the ground-wheel axle.

5 designates cross-bars secured to the planter-frame 4 and united by straps 6. (See Fig. I.)

7 is a chute secured to the rear cross-bar 5 and extending downwardly therefrom.

8 designates a furrow-opening shoe having a horizontal runner, the upper forward end of which is secured to the planter-frame 4 and the rear end of which is bifurcated to form a pair of wings 9 of moldboard shape, that are outturned and extend outwardly and upwardly from the horizontal runner, between which the lower end of the chute 7 rests, as seen in Figs. I and V. By bifurcating the shoe 8 and making the wings at the rear end thereof of the shape shown and described I provide for a thorough loosening of the soil and production of a furrow in the soil over which the planter travels V-shaped and into which the conducting-chute 7 drops the potatoes directly immediately after the furrow is opened, so that there is no opportunity for the soil closing into the furrow before potatoes are deposited therein and so that the potatoes will be covered at a proper depth effectually.

10 designates a seedbox, which is mounted on the cross-bars 5 and is provided with a main bottom 11, containing a single outlet-orifice 12, located directly above the chute 7.

13 designates a driven shaft journaled in boxes carried by the straps 6, mounted on the cross-bars 5. This shaft bears a sprocket-wheel 14, to which the endless chain 3 leads, to provide for the rotation of said shaft upon the rotation of the sprocket-wheel 2, carried by the ground-wheel axle of the planter. Fixed to the driven shaft 13 is a beveled pinion 15, that meshes with a beveled pinion 16, fixed to an upright shaft 17, which extends vertically through the seedbox 10 and the upper end of which is journaled in a spider 18, fixed to the seedbox. (See Figs. II and III.)

19 designates a false bottom fixed to the upright shaft 17 in the seedbox at an elevation above the main bottom 11. This false bottom is provided with a plurality of apertures 20, that provide communication between the upper portion of the seedbox and the space between the false bottom and the main bottom of said box. 21 is a conical deflector fixed to the upright shaft 17 and the false bottom 19, which diverges downwardly and outwardly to said false bottom to direct the potatoes in the seedbox to the apertures in said false bottom.

22 designates a cam-block rigidly secured to the main bottom of the seedbox and provided in its upper side with a cam-groove 23, (see Figs. III and IV,) that is elongated at 24 at the point thereof nearest to the outlet-orifice 12 in the main bottom of the seedbox.

25 designates wings that are fixed to the false bottom 19 at its under side adjacent to the apertures 20 therein, so as to be held stationary with respect to said false bottom.

26 designates swinging wings pivoted to the stationary wings 25 by pins 27, seated therein. Each of the swinging wings is provided with an ear 28, bearing a pin 29.

30 designates bell-crank levers pivoted at 31 to the false bottom of the seedbox 10. These bell-crank levers are of a number corresponding to the series of swinging wings 26, and their outer ends contain slots 32, which receive the pins 29, carried by the swinging wing-ears 28. Seated in the inner ends of the bell-crank levers 30 are pins 33, which operate in the cam-groove 23.

34 designates a deflector-plate which operates through a slot 10' in the seedbox-wall and extends into the seedbox at a point immediately above the false bottom 19 and in line with the outlet-orifice 12 in the seedbox-bottom. (See Figs. II and III.) The pivotal end of the deflector-plate 34 is positioned exterior of the seedbox and is fixed to a pivot-rod 35, which is journaled in brackets 36, secured to the seedbox.

37 is a coil-spring surrounding the pivot-rod 35 and having one end resting against the seedbox, (see Fig. IV,) while the opposite end has engagement with the deflector-plate 34, as seen in Figs. II and III.

In the practical use of my planter the potatoes are placed in the seedbox, and on being deposited therein they descend onto the false bottom 19 and partly through the apertures 20 in said false bottom into positions between the wings 25 and 26, carried by the false bottom, and which at the time the potatoes pass therein are in unspread condition during the part of their travel aside from the location of the outlet-orifice 12 in the main bottom of the seedbox. When the potatoes occupy the seedbox, they are constantly deflected into the circular area occupied by the plurality of apertures in the false bottom by the cone 21, surmounting said false bottom. During the travel of the planter in planting operation the shaft 13 is constantly rotated by means of its gearing connection to the ground-wheel axle, and therefore like movement is continually imparted to the upright shaft 17, through the medium of which the dropping mechanism in the seedbox is actuated. As said upright shaft rotates it carries therewith the false bottom 19, the cone 21, wings 25 and 26, and bell-crank levers 30, connected to said false bottom. While the wings 25 and 26 are making the circuit within the seedbox during the rotation of the false bottom 19 aside from the location of the outlet-orifice 12 in the main bottom of the seedbox, the swinging wings 26 remain in unspread positions to receive a specified amount of potatoes to be dropped into the ground for each hill in the row to be planted. As each pair of wings approaches the outlet-orifice 12 the pin 33 in the corresponding bell-crank lever rides onto the elongated projection of the cam 24, and the bell-crank lever is thereby rocked to swing the wing 26, to which it is connected, thereby enlarging the space between the pair of wings and permitting the ready escape of the potatoes previously confined between them through the outlet-orifice 12 to descend therefrom through the chute 7 into the furrow previously made by the shoe 8. As each pair of wings 25 and 26 approaches the outlet-orifice during the rotation of the false bottom 19 any potatoes that are projecting upwardly through the corresponding aperture 20 in the false bottom are deflected out of said aperture by the deflector-plate 34, which yields under the control of the spring 37 sufficiently to prevent cutting of the potatoes thereby. Such deflector-plate also serves to prevent the potatoes in the seedbox from passing directly out of said box through the aperture in the false bottom that is momentarily in registration with the outlet-orifice. The deflector-plate may have a straight edge, so that it will not injure the potatoes that come in contact therewith, or it may be provided with a cutting edge that will cut the potatoes where they project above its path of movement, thereby dividing the portion beneath the false bottom from the portion projecting above it.

I claim as my invention—

1. In a potato-planter, the combination of a seedbox having a bottom provided with an outlet-orifice, an apertured false bottom rotatably mounted in said seedbox, means for rotating said false bottom, wings carried by said false bottom beneath the apertures therein, and means for spreading said wings during the period of their travel past the outlet-orifice in the seedbox-bottom, substantially as set forth.

2. In a potato-planter, the combination of a seedbox having a bottom provided with an outlet-orifice, an apertured false bottom rotatably mounted in said seedbox, means for rotating said false bottom, wings fixed to said false bottom beneath the apertures therein, swinging wings pivoted to said fixed wings, and means for rocking said swinging wings during the period of their travel past the outlet-orifice in the seedbox-bottom, substantially as set forth.

3. In a potato-planter, the combination of a seedbox having a bottom provided with an outlet-orifice, an apertured false bottom rotatably mounted in said seedbox, means for rotating said false bottom, wings fixed to said false bottom beneath the apertures therein, swinging wings pivoted to said fixed wings, levers pivoted to said false bottom and having engagement with said swinging wings, and a cam fixed to said seedbox-bottom to receive and actuate said levers for the purpose of rocking said swinging wings, substantially as set forth.

4. In a potato-planter, the combination of a seedbox having a bottom provided with an outlet-orifice, an apertured false bottom rotatably mounted in said seedbox, means for rotating said false bottom, means carried by said false bottom, for conveying the potatoes deposited through the apertures therein to said outlet-orifice, and a spring-controlled deflector-plate surmounting said false bottom above the location of said outlet-orifice, substantially as set forth.

5. The combination with a potato-planter, of a shoe having a horizontally-extending runner and having its rear end divided into diverging wings of moldboard shape extending upwardly and outwardly from said runner, substantially as set forth.

HENRY J. SPRINGER.

In presence of—
   OTTO J. SPRINGER,
   GUS SOEHLKE.